United States Patent [19]

McCarthy et al.

[11] Patent Number: 4,802,748
[45] Date of Patent: Feb. 7, 1989

[54] CONFOCAL TANDEM SCANNING REFLECTED LIGHT MICROSCOPE

[75] Inventors: Jon J. McCarthy, Middleton, Wis.; John D. Fairing, Baldwin, Mo.; Jeffrey C. Buchholz, Cross Plains, Wis.

[73] Assignee: Tracor Northern, Inc., Middleton, Wis.

[21] Appl. No.: 132,779

[22] Filed: Dec. 14, 1987

[51] Int. Cl.$^4$ .................. G02B 21/00; G02B 21/06; G02B 26/02

[52] U.S. Cl. .................. 350/507; 350/527; 350/274

[58] Field of Search ............... 350/506, 527, 6.3, 235, 350/448, 273, 274

[56] References Cited

U.S. PATENT DOCUMENTS 3,517,980 6/1970 Petran et al. .................. 350/527

FOREIGN PATENT DOCUMENTS 128936 9/1986 Czechoslovakia .
128937 9/1986 Czechoslovakia .

OTHER PUBLICATIONS

"Micromachining of Silicon Mechanical Structure", Journal of Vacuum Society Technol. Bulletin 3(4), Jul.-/Aug. 1985 pp. 1015-1025, G. Kaminsky.
"Tandem Scanning Reflected Light Microscope Science of Biological Specimen Preparation" (pp. 85-94) SEM Inc. AMF O'Hare, Petran et al.
Petran et al., "Tandem-Scanning Reflected-Light Microscope," Journal of the Optical Society of America, vol. 58, pp. 661-665.
Brakenhoff, "Confocal Scanning Light Microscopy with High Aperture Immersion Lenses," Journal of Microscopy, vol. 117, pt. 2 (Nov. 1979).
Wilson, "Scanning Optical Microscopy," SCANNING, vol. 7, pp. 79-87 (1985).
Maher, "The SOMSEM"-"An SEM-Based Scanning Optical Microscopy," SCANNING, vol. 7, pp. 61-65 (1985).
van der Voort, "Design and Use of a Computer Controlled Confocal Microscope for Biological Applications," SCANNING, vol. 7, pp. 66-78 (1985).
Wilke, "Optical Scanning Microscope-The Laser Scan Microscopy," SCANNING, vol. 7, pp. 88-96 (1985).
Boyde, "The Tandem Scanning Reflected Light Microscope Part 2-Pre-Micro '84 Application at UCL," Proceedings RMS, vol. 20/3, pp. 131-139 (May 1985).
Petran, "The Tandem Scanning Reflected Light Microscope Part 1-The Principle, and its Design," Proceedings RMS, vol. 20/3, pp. 125-129 (May 1985).
Petran, "The Tandem Scanning Reflected Light Microscope," SCANNING, vol. 7, pp. 97-108 (1985).
Kosik International-Tandem Scanning Reflected Light Microscope.

*Primary Examiner*—John K. Corbin
*Assistant Examiner*—Ronald M. Kachmarik

[57] ABSTRACT

A Tandem Scanning Microscope is disclosed using a modified Nipkow disk design. With this scanning system, scanning is performed using many apertures at once and using one disk for both image and illumination scanning. The apertures in the disk are in an annular pattern of spiral arms. Each aperture is located along a spiral arm at the end of a radius vector. Relative aperture locations are established in accordance with a mathematical relationship.

5 Claims, 3 Drawing Sheets

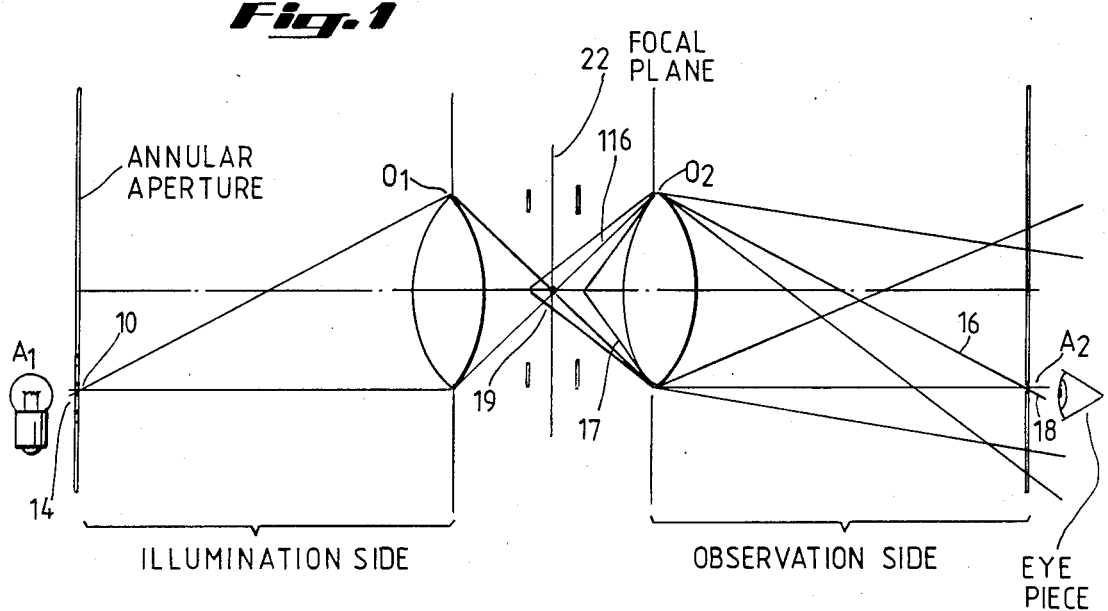
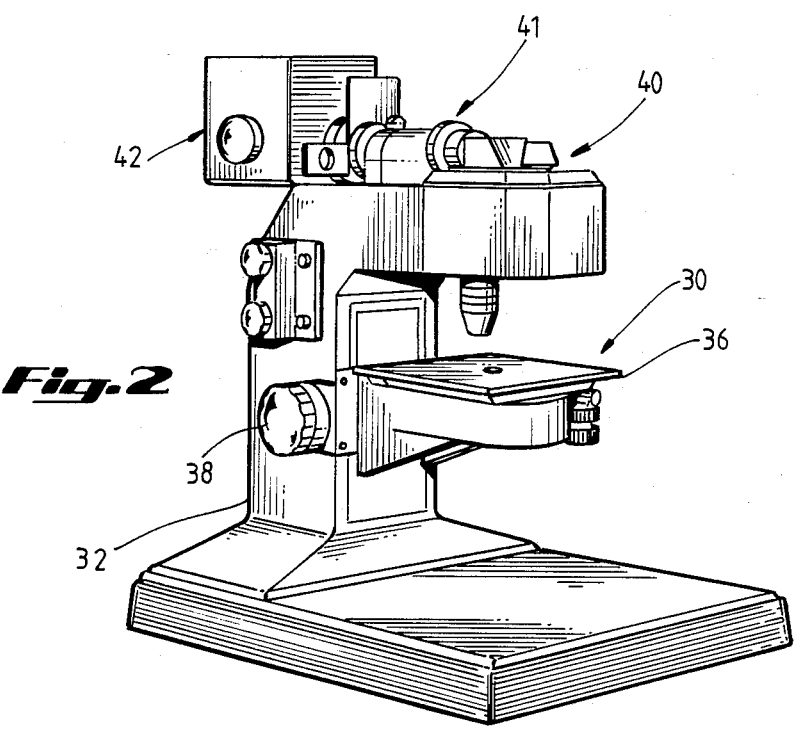

CONFOCAL TANDEM SCANNING REFLECTED LIGHT MICROSCOPE

BACKGROUND OF THE INVENTION

The present invention relates to scanned imaging; and more particularly, it relates to devices for scanning a field to be imaged, such as a Tandem Scanning Microscope (TSM).

Image formation can be accomplished by confocal imaging techniques which involve mechanical or electronic scanning. Exemplary of these techniques is the Tandem Scanning Reflected Light Microscope (TSRLM). The theory of TSRLM is discussed by Petran and Hadravsky in "Tandem-Scanning Reflected-Light Microscope," *Journal of the Optical Society of America,* Vol. 58, No. 5, pp. 661-64 (May 1968). The TSRLM is further described and illustrated by Petran, Hadravsky, and Boyde in "The Tandem Scanning Reflected Light Microscope," *SCANNING,* Vol. 7, No. 2, pp. 97-108 (1985). U.S. Pat. No. 3,517,980 to Petran et al. also describes a TSRLM device.

The scanning device in a TSRLM is a rotating disk having holes in an annular region. The holes are arranged on Archimedean spirals. Diametrically opposite holes are on identical radii, and the pattern as a whole has a central symmetry. This device is known as a Nipkow disk. The structure of such a disk has conventionally been a copper foil sheet stretched over a retaining ring and having holes etched therein.

SUMMARY OF THE INVENTION

The present invention provides improvements in scanning patterns used in imaging systems. The present invention particularly provides improvements in the scanning system used in a TSM.

The TSM of the present invention is similar to the tandem scanning reflected light microscope by Mojmir Petran and Milan Hadravsky, and described in numerous publications. In contrast to more complex and costly confocal laser microscopes, the present invention employs an innovative scanning system which provides high resolution images at high frame repetition rates. The steady image produced is suitable for direct viewing with the eye or TV and film cameras. The image is linearly scanned and images may be digitized directly into a frame buffer without correction. Illumination is provided by standard lamps which allow rapid, convenient change-over from visible true color to fluorescence operation using filtered (selected) wavelength excitation.

The scanning system includes a scanning disk. In one embodiment, this disk contains several tens of thousands of apertures arranged in a precise pattern that is symmetric about any diameter. The disk is placed at the intermediate image plane of the objective. The specimen and the image formed by the objective is viewed through the conjugate aperture on the opposite side. As the disk is rotated, the specimen is illuminated in small "patchels" lying in the focal plane. As the "patchels" are scanned across the specimen, an image of the entire field of view is created. Since only light reflected from these illuminated "patchels" in the focal plane can pass through the aperture holes on the viewing side, the image contains contrast and resolution superior to conventional light microscopes.

The discrete focal plane of the TSM of the present invention provides an optical sectioning ability difficult to achieve with conventional light microscopes. The TSM provides images with unmatched clarity from the surface to any depth within the sample, limited only by the transparency of the material and the working distance to the objective used. In addition, the TSM provides up to 1.28 times the resolution of conventional light microscopes.

The TSM allows precise optical examination of surfaces at high resolution when the surfaces does not reflect enough light at normal incidence to be imaged using conventional optics. The TSM provides a continuous image, which means the operator can enjoy direct viewing in true color while moving the in-focus plane through a sample. The TSM can be used to study (with high spatial resolution) the surface topography of reflective, opaque specimens.

BRIEF DESCRIPTION OF THE DRAWINGS

A written description setting forth the best mode presently known for carrying out the present invention, and of the manner of implementing and using it, is provided by the following detailed description of a preferred embodiment which is illustrated in the attached drawings wherein:

FIG. 1 is a diagram of the confocal imaging light paths within a Tandem Scanning Microscope (TSM);

FIG. 2 is an illustration of the physical configuration of a TSM in accordance with the present invention;

DETAILED DESCRIPTION OF AN ILLUSTRATIVE EMBODIMENT

Figure 3:
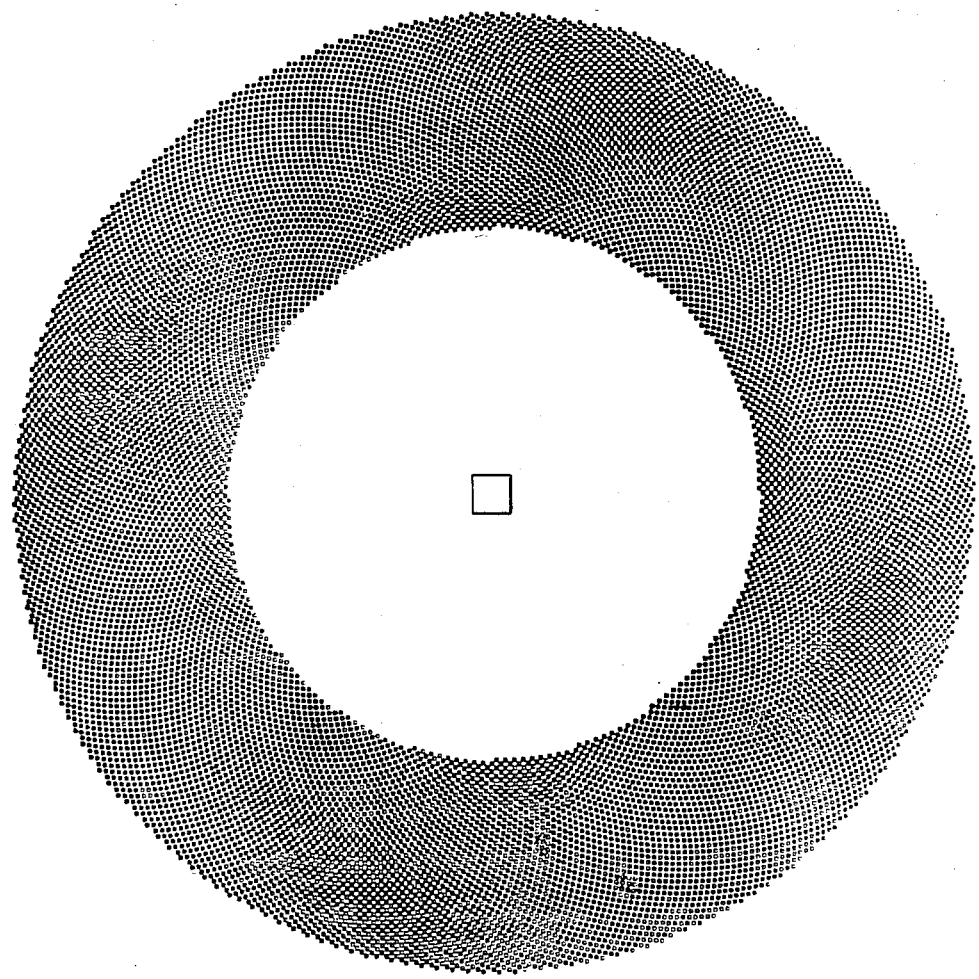
FIG. 3 is a depiction of the aperture pattern of a scanning disk for use in a TSM in accordance with the present invention.

A. The Basic Principles of the TSM

Tandem scanning microscopy (TSM) involves confocal imaging. The light ray diagram in FIG. 1 illustrates the principles of confocal microscopy. In FIG. 1, illumination 14 enters through an illuminating aperture 10 on a scanning disk and is focused by objective lenses, 01 and 02. Only reflective light 16 from the focal plane of the objective passes through the viewing aperture 18. Light 17 emitted from above or light 19 from below the focal plane 22 is not brought to focus on the viewing aperture and is blocked by the disk. Aperture 18 is a conjugate aperture on the observation side of the scanning disk. In practical devices, there are thousands of apertures on the disk.

Objects in the focal plane of the objective are illuminated by the point source, and the light reflected by the specimen is seen by a point detector. In practice, the point source and point detector are obtained by placing apertures between a conventional source and detector and the objective lens. Confocal imaging is achieved when the system is precisely aligned via a system of adjustable mirrors and a beam splitter so that rays from the source aperture pass through the viewing aperture. As shown, rays that emerge from objects out of the focal plane are not focused at the viewing aperture and are blocked from reaching the detector. The result is a high contrast image of a small portion of the specimen at the focal plane. To see an entire field, a means is required to scan either the specimen or the illumination and detector. This is accomplished by scanning the source and detector by means of a scanning disk having light transmissive areas.

For additional discussion of TSM theory, the publications cited in the background are instructive.

B. Structure of the TSM

The diagram of FIG. 2 illustrates a physical form for a practical TSM instrument. The instrument 30 has a stand 32 for placement on a planar surface such as a table top. The stand 32 supports specimen platform 36. Vertical adjustment of platform 36 is provided by rotation of knobs 38. Mounted atop stand 32 is the head 40 which includes the optical components and scanning disk. Also included is Epi-illuminator 41 conveys light from the lamphouse 42 into the head. The Epi-illuminator contains several lenses, iris diaphragms and filter holders in order to adjust the apparent brightness and emission spectrum of the light source.

For further information as to the structure for re-aligning a TSM, U.S. Pat. No. 3,517,980 is hereby incorporated by reference.

1. The Optical Components

Eyepiece: The Ramsden type with the focal plane in front of the lens; magnifications of 10x and 15x can be used with the microscope.

Objectives: A standard threaded objective (RMS thread) with tubelength (engraved on the body) of 160, 165, or 170 mm can be used. (Infinity tubelength objectives can be used with a special correcting lens.) Although any conventional LM objective can be used, immersion objectives are preferred with the refraction index of the immersion medium to be matched to that of the specimen to be observed when studying internal structures. Water, oil and glycerin immersion objectives are the most commonly used. Dry objectives may be used for examination of internal structure in translucent samples used in the study of surfaces. Water immersion objectives are used for living animal and plant tissues; oil for bone, tooth and rock (fossil) samples; and glycerine or oil for fluorescence.

Beam Splitter: The beam splitting pellicle is extremely thin, so as not to double the image or introduce astigmatism. As regards to the use of the TSM in the fluorescence mode, we should note that reflection for UV is <50% and the transmission of visible >50%, thus enhancing its characteristics in this context. Pellicles with a variety of wavelength selective coatings to selectively enhance transmission and reflectance for a given application may be used.

Illumination: Practical experience has shown that the most convenient light sources are a standard tungsten lamp for visible and some fluorescence work, a mercury lamp or xenon lamp for extended spectral response.

2. The Scanning Disk

A scanning disk pattern in accordance with a single disk system embodiment is shown in FIG. 3. This unique disk pattern contains several tens of thousands of apertures arranged in a precise pattern that is symmetric along any diameter. The disk is placed at the intermediate image plane of the objective. The specimen image formed by the objective is viewed through the conjugate aperture on the opposite side. As the disk is rotated, the specimen is illuminated in small "patchels" lying in the focal plane. As the "patchels" are scanned across the specimen, an image of the entire field of view is created. Since only light reflected from these illuminated "patchels" in the focal plane can pass through the aperture holes on the viewing side, the image contains contrast and resolution superior to conventional light microscopes.

Figure 5:
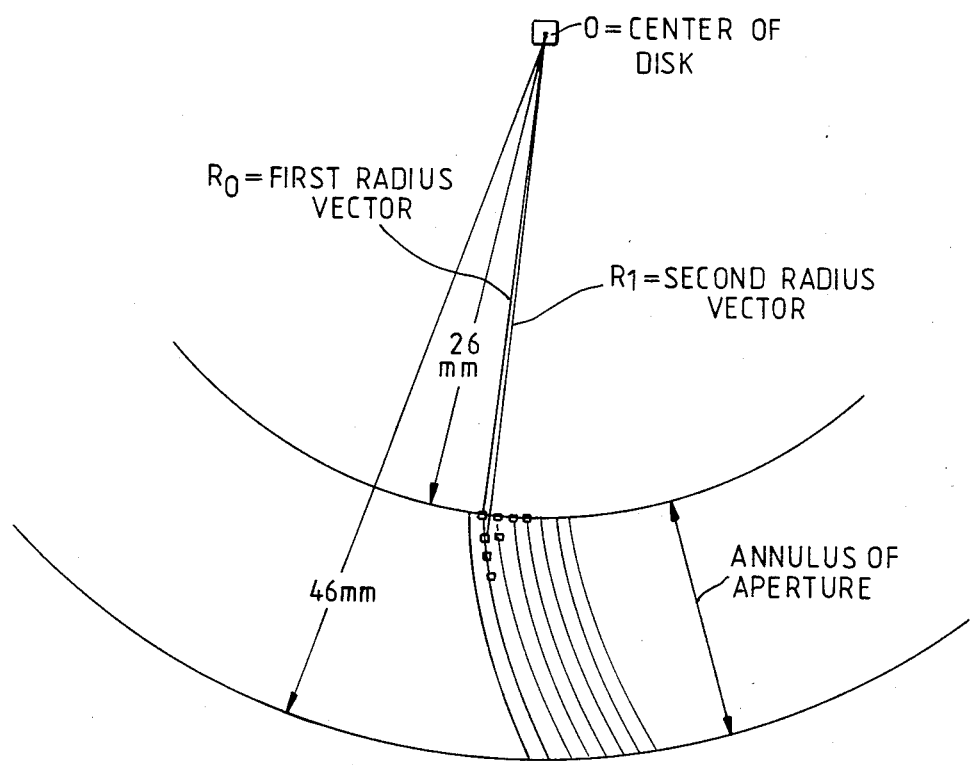
FIG. 5 is a diagram illustrating the geometrical relationship of the apertures in the pattern of the scanning disk of FIG. 3.

The scanning disk has an annular pattern of apertures around its circumference such that upon rotation, a uniform transmission of light occurs across the entire annulus. Confocal operation has the apertures located across from each other along a disk diameter so as to be precisely overlapped when viewed through the imaging system (i.e., the pattern of apertures must be symmetric along any diameter). These requirements are met by locating the apertures on the arms of a plurality of spirals and at the ends of radius vectors. The following discussion concerning the aperture arrangement is best understood with reference to FIGS. 3, 4 and 5.

The apertures are located along the arms of a plurality of spirals. Let $R_0$ be the radial distance from the center of the disk to the innermost aperture on the disk. The next aperture on the spiral is located at a radius $R_1$ from the center of the disk in such a way that the increase of the radius from $R_0$ to $R_1$ is in an inverse proportion of $R_1$ as stated in Eq. 1 and 2 in which K is a constant.

$$R_1 = R_0 + R_1/K \qquad \text{Eq. 1}$$

$$R_1 = [R_0 + (R_0^2 + 4K)^{\frac{1}{2}}] \qquad \text{Eq. 2}$$

A further requirement is that all the apertures along a spiral be a uniform distance apart. Let this distance be L, then the radius vectors connecting the first and second will form an angle T at the center of the disk as given by Eq. 3.

$$T = \cos^{-1}[(R_0^2 + R_1^2 - L^2)/2R_0R_1] \qquad \text{Eq. 3}$$

Similarly with all other points on a spiral as shown in Eq. 4 and 5 where $R_n$ is the radius vector of point n and $R_{n-1}$ is the radius vector of the point n−1 (i.e. the proceeding point) and K has the same value as before.

$$R_n = [R_{n-1}(R_{n-1}^2 + 4K)^{\frac{1}{2}}]/2 \qquad \text{Eq. 4}$$

$$T = \cos^{-1}[(R_{n-1}^2 + R_n^2 - L^2/2R_nR_{n-1}] \qquad \text{Eq. 5}$$

Figure 4:
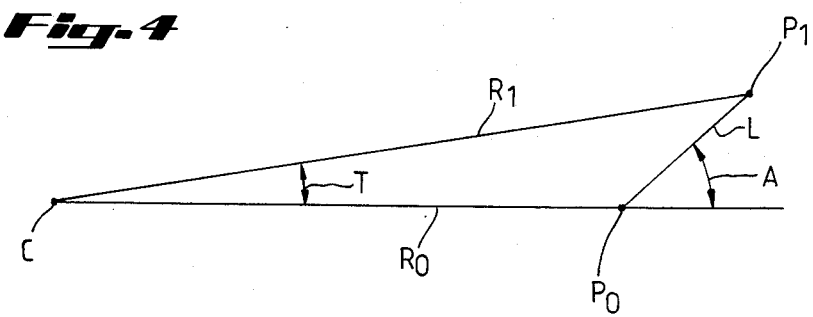
FIG. 4 is a diagram of the mathematical relationship of the apertures in the pattern of FIG. 3.

FIG. 4 represents the conditions of Equations 2 and 3 where C is the center of the annulus, $P_0$ the initial aperture on the spiral and $P_1$ the second aperture. $R_0$ and $R_1$ are the radius vectors to these points, while T is the angle formed by the vectors $R_0$ and $R_1$. The angle A determines the value of the constant K (or visa versa) as indicated in Equations 6 and 7.

$$R_1 = (R_0^2 + L^2 + 2R_0L \cos A)^{\frac{1}{2}} \qquad \text{Eq. 6}$$

$$K = R_1^2 - R_0R_1 \qquad \text{Eq. 7}$$

It should be noted that the angle A refers only to the first cord of the spiral with the value of $R_0$.

The values of $R_0$ and K are constant for all spirals. However, in order for the apertures to overlap during the scanning of the disk it is necessary for successive spirals to have the initial apertures radially offset. This offset is added to $R_0$ to determine the actual radius of the first point on each subsequent spiral.

Practical realization of the above-described pattern of apertures in a disk has been achieved by micromachining the pattern into a silicon wafer. Such a process for producing geometrically precise silicon structures is well-known in the art as shown in G. Kaminsky, "Micromachining of Silicon Mechanical Structures," *J. Vac. Sci. Technol. B.*, 3(4), 1015–1025 (1985), which is hereby incorporated by reference.

Disks are fabricated in the following manner. Silicon wafers (100 mm diameter) are thinned to the proper thickness (0.0101 inch for 60 microns holes) which in addition to the size of the lithography mask determines the size of the final holes in the disk. The pattern is printed upon the wafer by normal lithographic techniques employing a mask. The exposed wafers are etched with a directional chemical etch to produce a series of square holes in the desired pattern. The present disk contains 13,642 holes, each being 60 microns from side to side, arranged along spirals in an overall annular configuration. The inner radius of the annulus is 26 mm, the outer radius 46 mm. The value of "K" is 11.30231. The value of "L" is 0.6 mm. The value of "$R_0$" is the inner radius value of 26 mm. Since it is desirable to keep the transmission of the disk limited to about 1% of incident light, hole size must be reduced if more holes are desired in the pattern. To optimize lateral and axial resolution in an optical microscope image, a hole size of 20 microns is required, which determines the maximum number of holes to be about 70,000 holes. Such a disk could be made with the techniques described by Kaminsky. The sides of each hole are sloped at a fifty-two degree angle. The angle is fixed by the crystal lattices of the silicon.

Although a mechanical means for providing the scanning disk pattern is described, other means could be used. For example, electronic pattern generation could be used in the TSM. One such electronic means is a Kerr cell array. A Kerr cell is a solid state optical switch; it transmits the light in one state, and does not in the other state. A two-dimensional array of Kerr cells could replace the entire mechanical scanning disk, or merely replace portions of the disk in the illumination or viewing lens pupils. The Kerr cells could be switched electronically so as to scan across the field of view. As light is transmitted via an illuminating cell, the corresponding viewing cell would also transmit reflected light from the specimen to the eyepieces.

Another electronic means of pattern generation is CRT illumination/image dissection. With this means, illumination would be provided by scanning an electron beam across the face of a CRT tube in a fixed pattern, perhaps the spirals of our pattern. Typical spot sizes are on the order of tens of microns. The light from the phosphor would provide the illumination for the system. Light reflected by the sample would not be viewed directly but detected on an image dissector tube. An image dissector (ID) is essentially a photomultiplier Tube (PMT) with focus and scan coils added. Internal to the dissector is a small aperture (<100 μm) between the photocathode and the dynodes. The signal from a small area of the photocathode is focused through the aperture at any given instant, and the entire cathode can be scanned using the scan coils. The Image Dissector functions as a point detector which can be scanned across the field of view. If its scan is precisely synchronized to the illuminating CRT scan, confocal operation is achieved. The optical layout could be the same as in the reflected TSM with the CRT and ID replacing the disk at the intermediate plane of the objective. Alternatively, transmitted light work could be done by locating the ID below a second objective below the specimen as is done in the laser scan confocal microscopes.

C. The Operation of the TSM

Basic operation of the TSM of the present invention is similar to prior art devices. The point of distinction concerns improvements in the image scanning performed with the disk. In the TSM, the array of apertures provides incoming light as a series of beams which scan the field of view and illuminate patches in the plane of focus more intensely than out of focus layers. Reflected light from these patches is imaged onto apertures of the array which are scanning in the focal plane of the eyepiece. The array of apertures which chop the illuminating beam is identical with the array on the observation side. The scanning, illuminating apertures are imaged by the objective lens in the focussed-on plane. Reflected light from the patches in this plane is imaged back into corresponding apertures which also lie in the intermediate image plane of the objective. All other reflected light from out of focus layers and light scattered from optical surfaces in the microscope is intercepted by the solid portions of the aperture array or by light traps in the microscope head. Scanning of illumination and observation is done with one device by having all the apertures fabricated in one rotating disk. Each aperture pair in the disk is unique, lying at a different radial distance from the center of the disk and scanning a single line in the image.

Both sides of the disk are at the same distance from the lens which serves for both illumination (condensor) and image formation (objective). The two functions of the objective are separated by a very thin beam splitting, semi-transparent mirror. The congruence (or overlap) of both patterns of apertures formed by the objective in the focussed-on plane is accomplished by a mirror system, which converts central symmetry of the disk into congruency.

Since the holes are much smaller than the distance between them, it follows that the precision of manufacture of the pattern of holes in the disk and of the adjustment of the mirrors, must be exquisite. The new scanning disk in the TSM is manufactured to high technological standards. The mean size of the square holes is 60–80 micrometers or less, but the size can be varied as required. The number of scanning lines is such that one cannot observe the scanning lines in the image because their separation is less than the resolution of the microscope. The disk is illuminated by a strong light source, so that a pattern of light spots is formed. The images are created in the focussed-on layer of the specimen. Light is reflected by the features which are to be observed. Images of the instantaneously illuminated structures are formed by the objective on the other side of the scanning disk. Only the light from the focussed-on layer can enter the eyepiece.

The disk speed is variable and can be established to given an apparently stationary image.

The TSM described herein is an embodiment of the present invention in which a single disk is used. Such an embodiment requires that the disk perform two functions: image the illumination onto the specimen and select the resultant image point in the imaging beam. In order to perform these functions the disk must contain a plurality of identical sectors. If there are two such sectors, the disk will be symmetrical about any diameter, and the optical axis of the illuminating and imaging beams will intersect the disk at diametrically opposite points. If there are 3, 4, or 5 (etc.) such sectors, then the optical axes will intersect the disk at points whose radii from the disk center form angles of 120, 90, and 72 (etc.) degrees respectively.

A TSM can be constructed in which there are a plurality of disks, for example, a disk in the illuminating beam and one in the imaging beam. If these disks are synchronized, the symmetry requirement no longer applies. The disks, however, must be identical.

A TSM is also contemplated within the scope of this invention in which there are a plurality of disks not identical in size but geometrically similar. That is, the aperture patterns are identical except for scale. Such a TSM would be confocal between the objective lens and the specimen but would contain additional optical elements in either the illuminating or imaging beam (or both) such that the operation effect would be that of the TSM described here. Disk patterns which are mirror images of any described herein are also contemplated.

The shape of the apertures may be of any desired form including, but not limited to: circular, square, hexagonal, octagonal, rectangular and other geometrical forms. Furthermore, no limitation is implied concerning the orientation of any non-circular aperture. The size (absolute and relative) of the apertures may be varied to fit any particular application. Nothing contained in the above description shall be construed to restrict the choice of the number of spirals that may be present or any of the dimensions or parameters of the disk, the apertures, or the aperture patterns.

The foregoing description of the invention has been directed to a particular preferred embodiment for purposes of explanation and illustration. It will be apparent, however, to those skilled in this art that many modifications and changes may be made without departing from the essence of the invention. It is the applicants' intention for the following claims to cover such equivalent modifications and changes as fall within the scope of the invention as defined by the following claims.

What is claimed is:

1. A scanning device for use in an optical imaging system, comprising:
an opaque disk having apertures formed therein in an annular pattern around the circumference of the disk;
the apertures being distributed within the annular pattern in a series of adjacent arcuate, radially-extending arms defined by radius vectors having their length $R_n$ determined in accordance with the relationship:

$$R_n = \frac{[R_{n-1} + (R_{n-1}^2 + 4K)^{\frac{1}{2}}]}{2}$$

where $R_{n-1}$ is the length of the preceding radius vector and K is a constant,
and their angle T of orientation determined in accordance with the relationship:

$$T = \cos^{-1}(R_n^2 + R_{n+1}^2 - L^2)/(2R_n R_{n+1})$$

where L is the distance between the ends of the radius vectors.

2. A tandem scanning microscope, comprising:
a rotating array of light transmissive areas, the areas being distributed within the annular pattern in a series of adjacent arcuate, radially-extending arms defined by radius vectors having their length $R_n$ determined in accordance with the relationship:

$$R_n = \frac{[R_{n-1} + (R_{n-1}^2 + 4K)^{\frac{1}{2}}]}{2}$$

where $R_{n-1}$ is the length of the preceding radius vector and K is a constant,
and their angle T of orientation determined in accordance with the relationship:

$$T = \cos^{-1}(R_n^2 + R_{n+1}^2 - L^2)/(2R_n R_{n+1})$$

where L is the distance between the ends of the radius vectors;
means including areas of the array for providing incoming light as a series of beams which scan in a specimen field of view and illuminate patches in a plane of focus; and
means for imaging reflected light from the illuminated patches in the focal plane onto areas of the array which are scanning in the focal plane of an eyepiece.

3. The apparatus of claim 2 wherein the array of light transmissive areas is formed in a micromachined silicon disk.

4. The apparatus of claim 3 wherein the light transmissive areas are formed as square holes.

5. A tandem scanning microscope, comprising:
a rotating disk having an array of apertures formed in a micromachined silicon structure;
means cooperating with an area of the array of apertures for providing incoming light as a series of beams which scan in a specimen field of view and illuminate patches in a plane of focus; and
means for imaging reflected light from the illuminated patches in the focal plane onto apertures of the array which are scanning in the focal plane of an eyepiece.

* * * * *

UNITED STATES PATENT AND TRADEMARK OFFICE
CERTIFICATE OF CORRECTION

PATENT NO. : 4,802,748

DATED : February 7, 1989

INVENTOR(S) : McCarthy et al.

It is certified that error appears in the above-identified patent and that said Letters Patent is hereby corrected as shown below:

Title page:

OTHER PUBLICATIONS

"Tandem Scanning Reflected Light Microscope Science of Biological Specimen Preparation" should read -- "Tandem Scanning Reflected Light Microscope," Science of Biological Specimen Preparation Column 3, line 16, "Epi-illuminator 41 conveys" should read -- Epi-illuminator 41 which conveys --.

Column 8, line 3, "$(R^2_{n-1} + 4K)^{1/2}$" should read -- $(R_{n-1}^2 + 4K)^{1/2}$ --.

UNITED STATES PATENT AND TRADEMARK OFFICE
CERTIFICATE OF CORRECTION

PATENT NO. : 4,802,748

DATED : February 7, 1989

INVENTOR(S) : McCarthy et al.

It is certified that error appears in the above-identified patent and that said Letters Patent is hereby corrected as shown below:

Column 8, line 22, "$(R^2_{n-1} + 4K)^{1/2}$" should read -- $(R_{n-1}^2 + 4K)^{1/2}$ --.

Signed and Sealed this

Twenty-second Day of August, 1989

Attest:

DONALD J. QUIGG

*Attesting Officer*  *Commissioner of Patents and Trademarks*